Figure 1:
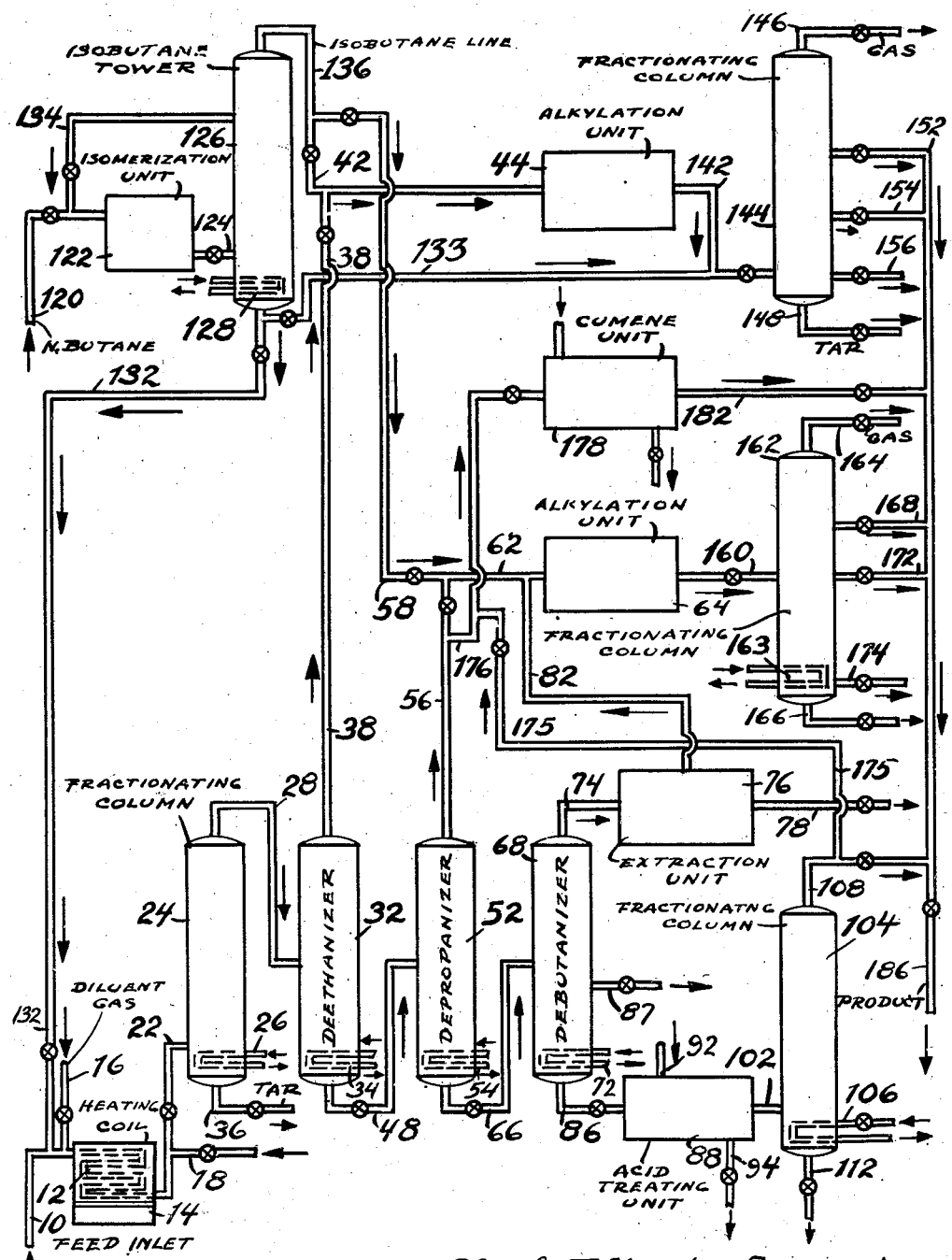

Patented Oct. 28, 1947

2,429,718

UNITED STATES PATENT OFFICE 2,429,718

PROCESS FOR PRODUCING AVIATION GASOLINE

Clarke T. Harding, Hillside, N. J., assignor to Standard Oil Development Company, a corporation of Delaware Application July 9, 1943, Serial No. 494,000

7 Claims. (Cl. 196—12)

This invention relates to treatment of hydrocarbons to produce internal combustion engine fuels, and more particularly, relates to the production of aviation gasoline.

Modern aviation engines require fuels of high rich mixture performance in order to permit take-off from the ground when the airplane is heavily loaded, or in other situations where large power outputs are needed. Among other requirements, the aviation fuel must have the proper distillation range, the proper octane number obtained by the conventional ASTM measuring methods and high rich mixture performance measured as reference IMEP (indicated mean effective pressure in pounds per square inch) on a standard supercharged aviation gasoline test engine. This method is known as Aviation Fuels Division-3C-Rich Mixture Octane Number method (AFD-3C-Rich Mixture) and also complies with Army-Navy Specification method AN-VV-F-748.

There are two ways in which the 3C rich mixture rating of an unknown fuel may be expressed; (1) as the equivalent of a reference fuel S plus the cc. of tetraethyl lead required per gallon to be added to the reference fuel S to match the knock intensity of the unknown fuel (as, for example, $S+2.5$ cc.) developed on a standard supercharged aviation gasoline test engine; or (2) the reference IMEP (indicated mean effective pressure in pounds per square inch) registered in the test engine at the specified intensity of knocking where the comparison against reference fuel S was made.

The IMEP is then the maximum pressure capable of being developed in the test engine by the fuel being tested without detonation and is accordingly a measure of the power output attainable with the given fuel. The higher the IMEP, the higher the power output of a given fuel or material and the more desirable the fuel or material is. The IMEP of S fuel without lead, for example, is 168, with 2 cc. of lead it is 218, and with 4 cc. of lead it is 244.

In the first use above given of rich mixture performance measurements, the unknown fuel plus 4 cc. of tetraethyl lead per gallon is compared against iso-octane (or its equivalent) which is called S reference fuel. If the unknown fuel is better than iso-octane or S reference fuel, then tetraethyl lead is added to the reference fuel to obtain a match in knocking tendency on the test engine. The unknown fuel is then rated as the equivalent of reference fuel plus the cc. of lead or $S+X$ where X is the number of additional cc. of lead. The second use above given of measuring rich mixture performance constitutes an alternative method of expressing the identical test results and consists of measuring the indicated mean effective pressure registered in the explosion cylinder of the test engine at the point of matching knock against the reference fuel.

If the unknown fuel is poorer than iso-octane or the reference fuel, then the reference fuel is diluted with a lower octane number reference fuel (equivalent to 95% by volume of 2,2,4-trimethyl pentane and 5% by volume of n-heptane) called M until a match in knocking tendency is obtained and the extent of dilution is recorded as the rating of the unknown fuel.

Accordingly, it will be seen that blending agents which possess IMEP blending values of 200 and above are very desirable provided their other properties conform to specifications. The IMEP's of benzene and toluene, for example, are about 320 to 350, and the IMEP of the total aromatic cut (145–350° F. boiling range) from cracking East Texas heavy naphtha at 1400° F. is 316, this being somewhat lower than benzene and toluene because of the presence of some ortho-xylol. Ortho-xylol is definitely poorer than either of its isomers, the meta- or the para-xylol. The IMEP of 2,3-dimethyl butane produced by alkylation of isobutane and ethylene is about 320. The isomer of 2,3-dimethyl butane, (2,2-dimethyl butane, or neohexane) is not nearly as potent, having an IMEP of only 220. Since the severe U. S. Army specifications limit the amount of aromatics which can be used in aviation gasoline, it is evident that isoparaffinic materials are of special interest, particularly for the highest performance aviation fuels.

According to my invention, hydrocarbons are cracked and then separated into different fractions and selected fractions are further treated and/or combined to produce aviation gasoline together with some by-products. For example, crude oils, gas oils, virgin motor gasolines, etc. may be used as feed stocks but I prefer to use heavy virgin naphtha as the feed stock.

According to the preferred form of my invention, heavy virgin naphtha is severely cracked to convert substantially all the paraffins and naphthenes into relatively pure aromatics contaminated with olefins and diolefins. During this cracking operation a large amount of ethylene is formed together with aromatics, such as benzene, toluene and xylenes, and some diolefins. The aromatics form an excellent blending material or base stock for aviation gasoline. The ethylene is alkylated with isobutane produced from normal butane from an extraneous source and results in the production of large amounts of 2,3-dimethyl butane, which has a high IMEP and forms an excellent blending agent for aviation gasoline.

$C_3$ hydrocarbons are also separated and alkylated with isobutane to form alkylate for use in the aviation gasoline.

If desired, a portion of the benzene may be separated and alkylated with propylene to form cumene which is suitable as a blending agent for the aviation gasoline.

From the cracked products butadiene is also separated, and if desired, it is possible to recover isoprene, piperylene, cyclopentadiene, and various other diolefinic or olefinic materials. These materials are well known as being valuable raw material for synthetic rubber or plastics.

In another form of the invention, motor gasoline is used as the feed stock and the gasoline is separated into a plurality of fractions by superfractionation. Isoheptane and isopentane are recovered and directly introduced into the aviation gasoline. The $C_4$ fraction is separated into an isobutane and normal butane fraction, the isobutane being used in the alkylation zones and the normal butane being passed to an isomerization zone for the production of additional isobutane. In this form of the invention, extraneous butane is also used and isomerized to produce isobutane for the process.

$C_5$ and $C_6$ hydrocarbons are isomerized in the presence of hydrogen and an isomerizing catalyst to produce higher boiling branched chain hydrocarbons which are added directly to the aviation gasoline.

The higher boiling fractions of the motor gasoline are then severely cracked as above pointed out in connection with the heavy naphtha feed to produce aromatics and ethylene and other olefins.

Figure 2:
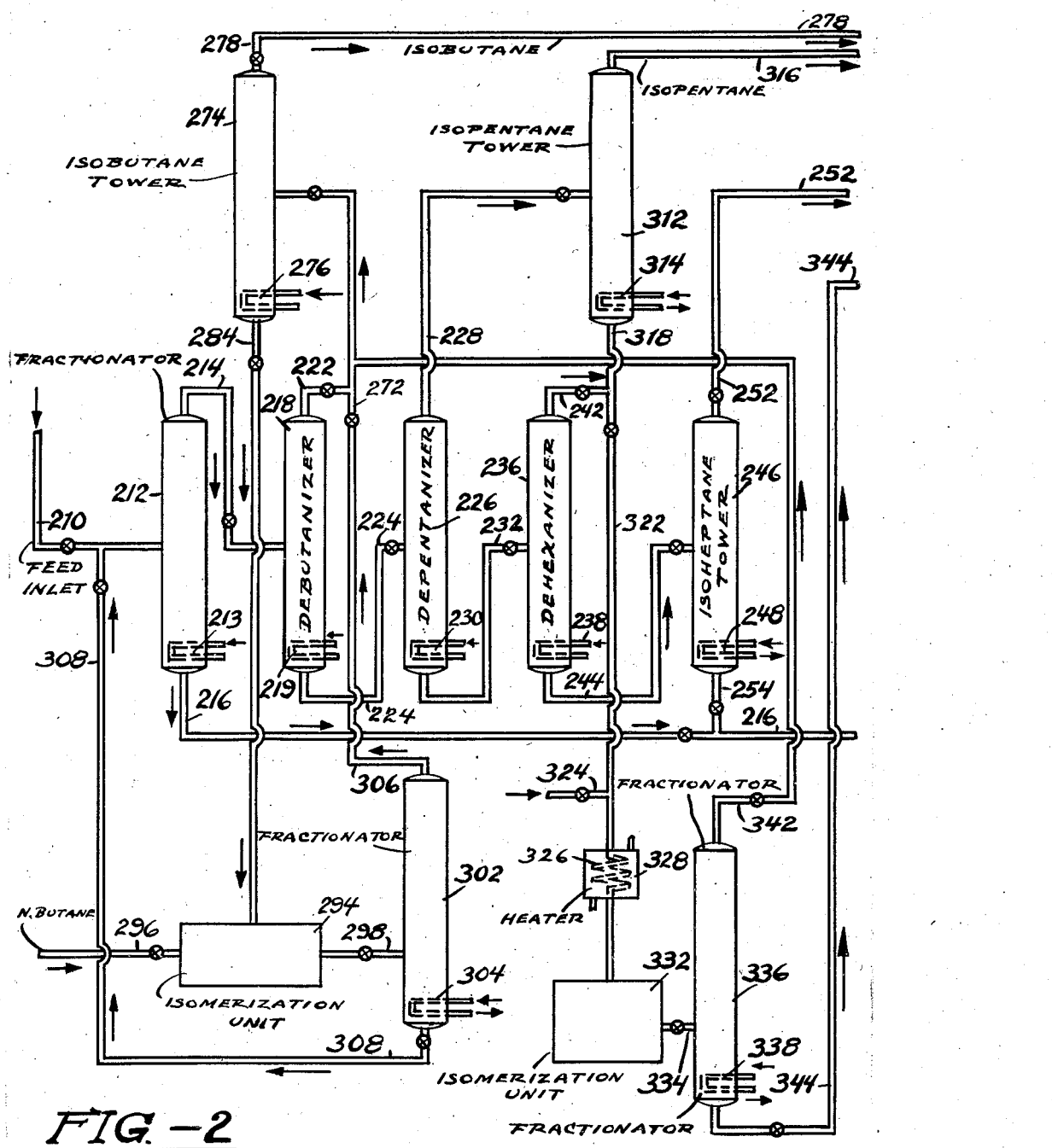

In the drawings,

Fig. 1 represents an apparatus for carrying out the preferred form of my invention; and Fig. 2 represents a portion of the apparatus for carrying out a modification of my invention.

Referring now to the drawing, the reference character 10 designates a line through which the feed is passed. The feed is preferably East Texas heavy virgin naphtha having a boiling range of about 200° to 410° F. The heavy naphtha feed is passed through a conversion or cracking zone 12 in a heater 14. Preferably, a diluent gas is introduced through line 16 into the hydrocarbons passing to the cracking zone. Any suitable heated inert gas may be used, such as normally gaseous hydrocarbons, nitrogen, etc., but preferably superheated steam is used. The steam is used in an amount of about 80 mol per cent. The stock to be cracked contains mostly paraffins and naphthenes, and in order to transform these into aromatic compounds and olefins and diolefins, it has been found that the feed stock should be heated to a temperature between about 1200° F. and 1400° F. for a relatively short period of time between about 10 seconds and 0.1 second, the longer times being used with the lower temperatures. For example, when operating at a temperature of about 1400° F., the time of contact or reaction is about 0.2 second.

This severe heating and cracking is especially adapted for my process because it produces aromatics boiling in the aviation gasoline range substantially free of undesired paraffins and at the same time produces large amounts of ethylene which is separated and mixed with isobutane and alkylated to form 2,3-dimethyl butane which has a high IMEP and forms a valuable aviation blending material. In addition, butadiene, isoprene, piperylene, cyclopentadiene, etc., are formed during the severe cracking and may be recovered as such.

After the cracking step, the products of reaction are quickly quenched by a quenching medium introduced through line 18 to a temperature of about 600°–1000° F. to stop the reaction. The cooled reaction products are passed through line 22 to a fractionating tower 24 having a heating means 26. Water is removed in any suitable manner. The lighter hydrocarbons pass overhead through line 28 and are passed into a fractionating tower 32 referred to as a de-ethanizer. Tower 32 is provided with heating means 34. Bottoms from the fractionating tower 24 are withdrawn through line 36 and contain tar and fuel oil. The lighter products formed during the reaction contain gaseous products which are separated in any suitable manner.

In the fractionating tower 32 a pressure of about 500 lbs./sq. in. is maintained and ethylene is taken overhead through line 38 together with some ethane, methane, and hydrogen. The separated ethylene cut is preferably mixed with isobutane passing through line 42 and the mixture alkylated in the alkylation zone 44 to produce 2,3-dimethyl butane, as will be presently described in greater detail. Alternatively, it is desirable in certain instances to use a more concentrated ethylene stream for alkylation, in which case one more fractionating tower is added to separate methane and lighter from the whole stream prior to entering the de-ethanizer.

Bottoms from the fractionating tower 32 are passed through line 48 and introduced into a second fractionating tower 52 for removing propylene from the remaining constituents. The tower 52 is maintained under a pressure of about 300 lbs./sq. in. The tower 52 is provided with a heating means 54. The propylene fraction is taken overhead through line 56 and is preferably mixed with the isobutane from line 58 and passed through line 62 to a second alkylation zone 64 for alkylating $C_3$ and $C_4$ hydrocarbons to be described in greater detail hereinafter. Bottoms from the tower 52 are passed through line 66 to a debutanizer tower 68 provided with a heating means 72.

The $C_4$ fraction containing butane, isobutane, butylenes and butadiene passes overhead through line 74. The $C_4$ fraction is introduced into an extraction zone 76 where it is mixed with a selective solvent for butadiene, such as aqueous ammoniacal copper solution, more specifically an ammoniacal cuprous acetate solution.

The butadiene is recovered by solution and subsequent regeneration from the copper solution, and withdrawn through line 78 and the remaining portion of the $C_4$ fraction is passed through line 82 to the alkylation zone 64. The alkylation treatment will be described hereinafter in greater detail.

Returning now to the bottoms from the debutanizer tower 68, the bottoms are withdrawn through line 86 and treated with sulfuric acid having a concentration of about 90–98% to remove olefins and diolefins from the desired cracked products which consist essentially of aromatic compounds in the gasoline boiling range. In order to minimize acid degradation or for the recovery of other by-products, such as isoprene, the C₅ cut may be removed through line 87 prior to treating. Acid in the amount of 25 lbs./bbl. of cracked products may be introduced into the treating zone 88 through line 92 and acid sludge may be withdrawn through line 94. The drastic cracking treatment of the hydrocarbons passing through the cracking zone 12 produces a preponderance of aromatics boiling in the aviation gasoline range, contaminated to a small extent with olefins and diolefins, and by the acid treatment the olefins and diolefins are removed so that only aromatic compounds, such as toluene, benzene and xylene, and higher aromatics remain as a pure aromatic fraction.

The acid-treated products are washed with water and alkaline liquid in conventional manner and pass through line 102 to a fractionating tower 104 provided with a heating means 106 to separate lighter aromatic compounds from heavier aromatic compounds. The lighter fraction passes overhead through line 108 and contains benzene, toluene and xylenes, the benzene and toluene forming about 75% by volume of the mixture. The toluene may be recovered from the mixture by fractionation and comprises nitration grade toluene without further treatment. About 99+% pure benzene may be recovered from the aromatic fraction by distillation and without further treatment.

These pure aromatic compounds present in the aromatic fraction described may be put to whatever use is most economic, such as nitration or alkylation, but form an extremely desirable constituent of aviation gasoline without separation or further treatment. The higher boiling aromatics up to about 350° F. are also of excellent quality for aviation gasoline and are included therein. The heavy aromatics boiling above about 350° F. are withdrawn as bottoms through line 112 from the fractionating tower 104. The C₅ fraction withdrawn from tower 68 through line 87 may be combined with heavy aromatics in line 112 for use in motor gasoline after suitable purification, as by clay treating.

Returning now to the first alkylation zone 44, it will be seen that the feed to this alkylation zone comprises isobutane and ethylene. The ethylene is separated from the reaction products resulting from the severe cracking and passes through line 38. The isobutane is produced from extraneous normal butane passing through line 120 to an isomerization zone 122 at reaction temperature and is contacted with a suitable isomerization catalyst to produce isobutane. The products of isomerization pass through line 124 to a fractionating zone 126 provided with a heating means 128 to separate isobutane from higher boiling constituents. Bottoms, including C₅ and higher boiling hydrocarbons, are withdrawn through line 132 and introduced into fractionator 144 through line 133 for recovey of C₅ and C₆ materials or may pass through line 10 for severe cracking treatment in the cracking zone 12. Normal butane is withdrawn through line 134 and recycled through line 120 to the isomerization zone 122. Isobutane is removed overhead through line 136 and a portion of this isobutane is passed through line 42 to the ethylene alkylation zone 44 and another portion of the isobutane is passed through line 58 to the second alkylation zone 64.

In the simplest case, the ethylene and isobutane are heated to a temperature of about 100–130° F. and contacted with a suitable alkylation catalyst, such as aluminum chloride or an organic complex thereof, or $BF_3H_2O$ catalyst in the alkylation zone 44. Other alkylation catalysts may be used. The rate of throughput of the mixture over the aluminum chloride catalyst is about two volumes of hydrocarbons, calculated as cold liquid, per volume of catalyst per hour. The reaction is carried out under a pressure of about 350 lbs./sq. in. The products of alkylation are passed through line 142 to a fractionating tower 144 to separate desired constituents from gas and bottoms. The gas which consists largely of those impurities present in the feed passes overhead through line 146 and the bottoms or heavy oil polymers are withdrawn from the bottom of the tower through line 148. Provision is made in the tower 144 to separate a C₅ and C₆ fraction and withdraw it through line 152 and a higher boiling C₇ and C₈ fraction and withdrawing it through line 154. Heavy alkylate is withdrawn from the lower portion in the tower 144 through line 156. This heavy alkylate may be used in ordinary motor gasoline.

The C₅ and C₆ fraction contains a relatively large amount of 2,3-dimethyl butane from the alkylation of ethylene and forms an exceedingly good blending agent for aviation gasoline.

In the ethylene alkylation, the feed mixture contains from three to ten, and preferably at least five, molecules of isobutane per molecule of ethylene.

The fractions withdrawn through lines 152 and 154 may be combined and directly introduced into the aviation gasoline.

Referring now to the second alkylation zone 64, the feed comprises isobutane from line 58, propylene passing through line 56 from tower 52 and butanes and butylenes from the extraction step 76 passing through line 82. In the simplest case this mixture is heated to a temperature of about 100° F. and then contacted with a suitable alkylation catalyst, such as sulfuric acid or hydrofluoric acid. Other alkylation catalysts may be used including aluminum chloride. The rate of throughput of the mixture over the sulfuric acid is about two volumes of hydrocarbon calculated as cold liquid per volume of catalyst per hour. The reaction is carried out under a pressure of about 200 lbs./sq. in.

The products of alkylation are passed through line 160 to a fractionating tower 162 provided with heating means 163 to separate desired constituents. Gas passes overhead through line 164 and bottoms, such as heavy polymers, are withdrawn from the bottom of the tower through line 166. An alkylate fraction containing mostly C₅ to C₈ branched chain hydrocarbons is withdrawn through line 168. Another fraction containing C₉ to C₁₂ hydrocarbons is withdrawn through line 172. These alkylate fractions contain isoparaffinic hydrocarbons present in commercially produced alkylates and are introduced directly into the aviation gasoline. A heavy alkylate boiling above about 350–370° F. is withdrawn from a lower portion in the tower 162 through line 174 and forms an excellent blending agent for ordinary motor gasolines.

If desired, a portion of the benzene may be separated from the aromatic fraction passing through line 108 and this benzene passed through line 175 and mixed with propylene withdrawn through line 176 from line 56. The mixture is passed to a third alkylation zone 178 under suitable conditions to produce cumene which is withdrawn through line 182. The cumene is introduced to the aviation gasoline. This step is given merely as an alternative and may be omitted if desired.

While I have shown two alkylation zones 44 and 64, it is within the contemplation of my invention to use a single alkylation zone for alkylating both the ethylene and isobutane and propylenes and isobutane. Or it may be desirable to use separate alkylation zones for alkylating $C_2$, $C_3$, $C_4$ olefins separately with isobutane so that special processing conditions may be individually employed.

According to the above process, the finished aviation gasoline produced containing the above enumerated fractions is withdrawn through line 186.

The aviation gasoline produced according to the above process is unique in its properties, in that, while it remains a true aviation gasoline as regards all specifications on boiling range, heating value, aromatics content, etc., nevertheless, it possesses more blending power in improving rich mixtures or 3C rating than do the commonly known special blending agents, such as commercial hydrocodimer or alkylates, which are very deficient in volatility—especially at the 167° F. point. It is also superior to the use of aromatics alone since these compounds (1) are generally less volatile; (2) have an adverse effect on lean mixture performance; and (3) are strictly limited in use by specification on this allowable content in the fuel.

The fuel produced by my invention has, for example, the following properties as compared to hydrocodimer and butenes alkylate.

|  | Special Fuel | Hydro-codimer | Butene Alkylate |
|---|---|---|---|
| Distillation Characteristics: |  |  |  |
| R. V. P | 5 | 2 | 3 |
| Per cent Dist. @ 167 | 29 | 0 | 0 |
| Per cent Dist. @ 221 | 70 | 50 | 50 |
| Per cent Dist. @ 293 | 96 | 90 | 90 |
| Octane Characteristics: |  |  |  |
| AFD-1C (+4 cc. TEL) Octane No | 107.5 | 107.5 | 107.5 |
| AFD-3C (+4 cc. TEL) IMEP | 287 | 280 | 240 |

This special fuel, therefore, may be considered as a special type blending agent since it may be blended directly into existing stocks of finished aviation fuel which are deficient in 3C quality in order to improve this quality without any of the reblending adjustments for volatility which would be required, for example, if either of the two above present type commercial blending agents were so used. Large volumes of improved quality fuel result for each volume of the special fuel used. The amount of aviation fuel improved in this manner depends upon the quality of the base fuel. For example, if it is desired to improve present commercial grade 130 aviation fuel of $S+1.25$ cc. of tetraethyl lead 3C rating to $S+2$ cc., only 23 per cent of the special fuel is required, or there results a production 430 per cent, based on the special fuel, of the $S+2$ cc. of tetraethyl lead quality blend. If it is desired to improve low quality virgin aviation base stock of about 91 1C to $S+1.25$ 3C quality there results a production of 180 per cent, based on the special fuel, of $S+1.25$ quality.

The especially superior blending properties of the fuel produced by my invention are due to the large amount of 2-3 dimethyl butane present in combination with aromatics, thus elevating 3C rating with none of the disadvantages of single component blending agents. Severe cracking, carried out as specified, produces raw materials in the precise ratio required to synthesize the special fuel claimed.

Referring now to Fig. 2 of the drawings, the reference character 210 designates a line through which virgin motor gasoline is passed and introduced into a fractionating tower 212 having a suitable heating means 213 in a lower portion thereof for supplying heat to the feed stock.

In the fractionator 212 lower boiling hydrocarbons are taken overhead through line 214 and higher boiling hydrocarbons are taken off as bottoms through line 216. The fraction taken overhead has an end boiling point of about 250° F. so that the fraction taken overhead contains $C_4$ to $C_8$ hydrocarbons. Fractionating tower 212 and all fractionating towers hereinbefore and hereinafter to be described contain means for refluxing in the tower during fractionation.

The lower boiling hydrocarbon fraction is introduced into fractionating tower 218 which may be called a debutanizer for removing $C_4$ hydrocarbons from the low boiling fraction. Fractionator 218 is provided with heating means 219 for supplying heat to the tower. A $C_4$ fraction is taken overhead as a vapor through line 222 and further treatment of this fraction to produce isobutane will be hereinafter described.

The bottoms from the fractionating tower 218 are passed through line 224 to another fractionating tower 226 which may be referred to as a depentanizer tower for removing $C_5$ hydrocarbons from the rest of the fraction. The $C_5$ hydrocarbons pass overhead through line 228 as vapors and are further treated as will be hereinafter described to separate normal pentane from isopentane. Tower 226 has heating means 230.

The bottoms from the fractionating tower 226 are passed through line 232 to another fractionating tower 236 having heating means 238. The tower 236 is used to remove a $C_6$ fraction from the higher boiling constituents and the $C_6$ fraction pasess overhead as a vapor through line 242.

Bottoms from the fractionating tower 236 are passed through line 244 to another fractionating tower 246 which is used to separate the lower boiling portion of the $C_7$ fraction overhead from higher boiling constituents. This lighter $C_7$ fraction contains mostly isoheptane which is used as one of the ingredients of aviation gasoline made according to my invention.

The fractionating tower 246 is provided with heating means 248 for supplying heat to the tower. The isoheptane fraction is withdrawn overhead as a vapor through line 252 and is cooled and recovered as a liquid fraction which may be added to the final product. The isoheptane is about the lowest quality material present, however, and in some cases it may be desirable to include it in the feed to the cracking unit 12 (Fig. 1) rather than including it in aviation gasoline. The higher boiling constituents are withdrawn as bottoms from the fractionating tower 246 through line 254 and are mixed with the higher boiling fraction of the feed stock withdrawn from the bottom of the first fractionating tower 212 through line 216.

This mixture is similar to the heavy naphtha feed used in the process described in Fig. 1 as it has a boiling range of about 200–410° F. and this mixture forms a feed which is passed through the process described in connection with Fig. 1 to produce aromatics and alkylate. When using the Fig. 2 modification, the isomerization zone 122 in Fig. 1 may be omitted as another isomerization zone is provided in Fig. 2.

Returning now to the debutanizer tower 218, the C4 hydrocarbons pass overhead through line 222 and are mixed with C4 hydrocarbons passing through line 272 from an isomerization step to be presently described and this mixture is introduced into a fractionating tower 274 referred to on the drawing as an isobutane tower. The tower 274 is provided with heating means 276. In this tower normal butane is separated from isobutane, the isobutane passing overhead through line 278 and being passed as part of the isobutane to either or both alkylation zones 44 and 64 in Fig. 1.

The normal butane is withdrawn as bottoms from the tower 274 through line 284 and is heated and then introduced into an isomerization zone 294. Normal butane from an extraneous source is introduced into the isomerization zone 294 through line 296. Any suitable isomerization catalyst, such as aluminum chloride and an activation agent, such as hydrogen chloride, may be used in the isomerization zone 294. The temperature during isomerization is about 200–325° F. and the throughput of the reactants over the catalyst is about 0.5 to 1.0 volume of hydrocarbon, calculated as cold liquid, per volume of catalyst per hour. Provisions are made for introducing fresh catalyst and for removing used catalyst from the isomerization zone.

The products of isomerization are passed through line 298 into a fractionating tower 302 provided with heating means 304. In the fractionating tower 302 normal and isobutane are taken overhead as a vapor through line 306 and higher boiling constituents are withdrawn as bottoms through line 308 and returned to the feed line 210 for introduction into the first fractionating tower 212. The line 306 forms a continuation of line 272 above described so that the C4 fraction is introduced into the isobutane tower 274 for separating isobutane from normal butane as above described.

Returning now to the depentanizer tower 226, the C5 fraction passing overhead through line 228 is introduced into a fractionating tower 312 which is designated isopentane tower on the drawing. The fractionating tower is provided with a heating means 314. The tower 312 is adapted to separate normal pentane from isopentane. The isopentane is lower boiling and is taken overhead through line 316. The isopentane is a desirable constituent for aviation gasoline and forms one of the blending agents to be added to aviation gasoline made according to this form of my invention.

Normal pentane is withdrawn from the bottom of the tower 312 through line 318 and is mixed with the C6 fraction leaving the top of tower 236 through line 242. The mixture of C5 and C6 hydrocarbons is then passed through line 322 and is further mixed with hydrogen introduced into line 322 through line 324. About 100 to 200 standard cubic feet of hydrogen per barrel of liquid C5 and C6 hydrocarbons is used. The mixture is then passed through a heating coil 326 in a heater 328 to heat the mixture to a temperature of about 300° F. and the heated mixture is then introduced into a second isomerization zone 332 wherein the mixture is contacted with an isomerization catalyst like anhydrous aluminum chloride, a hydrocarbon complex thereof, or other well known catalysts. The hydrocarbons are contacted with the catalyst at a throughput rate of about 1 to 3 volumes of hydrocarbon feed, calculated as cold oil, per volume of catalyst per hour. During isomerization of the C5 and C6 fractions, branched chain isomers are formed from the straight chain feed materials, for example, about 85 per cent of the normal pentane is converted to isopentane. The normal hexane is converted to a mixture of its branched chain isomers 2,2-dimethyl butane, methyl pentanes, etc., all of which are of improved octane rating over the feed.

The products of isomerization are withdrawn from the zone 332 through line 334 and introduced into a fractionating tower 336 provided with a heating means 338. The relatively light hydrocarbons which are formed by molecular splitting side reactions and which contain normal butane and isobutane and are passed overhead through line 342 in vapor form are introduced into line 222 for introduction into isobutane tower 274 wherein normal and isobutane are separated.

The bottoms from the tower 336 contains isopentane and isohexane and are withdrawn through line 344. The mixture contains mostly branched chain C5 and C6 hydrocarbons, isopentane, isohexane, etc., and forms one of the blending agents to be added to aviation gasoline made according to this form of my process.

From the above description of the Fig. 2 modification, it will be seen that isoheptane and isopentane are recovered by fractionation and may be added directly to the aviation gasoline. The separated butane fraction is isomerized to form part of the isobutane feed for the alkylation zone. Normal pentane and hexane are isomerized to form the iso-compounds. The heavy fraction of the feed passing through lines 216 and 254 is severely cracked to produce aromatics, olefins including ethylene and C3 and C4 olefins for alkylation, and butadiene, as described in the process in connection with Fig. 1 using heavy naphtha.

The aviation gasoline produced by the apparatus of the modification shown in Fig. 2 and supplemented by the showing in Fig. 1 is inferior to that produced from the process described in connection with Fig. 1 but produces an aviation gasoline having a 3-C rating of S+3.0 cc. of tetraethyl lead and has an IMEP of 235.

Best results are produced by alkylating isobutane with ethylene to produce the maximum yield of 2,3-dimethyl butane. The butylenes and propylenes from the cracking operation may be alkylated separately or jointly with isobutane to increase the yield of material suitable for use as blending agents but such alkylates are inferior to ethylene alkylates as blending agents for aviation gasoline. Also, for example, the propylene may be absorbed in sulfuric acid and hydrolyzed to form isopropyl ether, which is not presently used as a blending agent in aviation gasoline but which may be used for ordinary motor fuels. This material is of excellent octane rating but has certain disadvantages which have not yet been overcome for use in aviation fuel.

For optimum results and to produce maximum butadiene, isoprene, etc., as rubber raw materials, two-stage cracking may be used. When charging heavy virgin naphtha to the cracking operation, the first stage is operated to produce maximum diolefins and the temperature of cracking is about 1300° F. to 1375° F. for a time of reaction of about 0.3 second. Heavier stocks are less refractory, for example, only 1200° F. is required on virgin gas oil for the first stage cracking. After recovery of butadiene, isoprene, piperylene, etc., the distillate from the first stage is then recracked in a second stage under intensive conditions of at least 1375° F. and 1 second, or a time-temperature relationship of equivalent severity, to produce some incidental additional diolefin, such as butadiene, but mainly to convert the distillate material to aromatics. The liquid cracked products from the second stage are practically 90% to 100% aromatics and it is relatively simple to purify these reaction products by acid-treating and fractionating as above disclosed or described.

The highest quality aviation gasoline is therefore obtained in a mixture of 2,3-dimethyl butane plus benzene, toluene and xylenes together with $C_3$ and $C_4$ alkylate. One advantage in product quality obtained by using the modified form of my invention for treating virgin motor gasoline or naphthas is the fact that the combination of steps gives a product which is extremely volatile, approaching 40% at 158° F. yet with only 7 lbs. R. V. P. As a result, the product can carry relatively non-volatile lower performance base stocks and bring them up to the desired specifications on both octane rating and volatility.

Starting with virgin East Texas motor gasoline and carrying out my process, a yield of about 60% of aviation gasoline is produced. The aviation gasoline has an IMEP of about 235 with 4 cc. of lead. The amount of butadiene produced is about 3% by weight on the feed on single stage cracking, but may be approximately doubled without greatly affecting yields of other products by employing two-stage cracking as outlined.

While the drastic vapor phase cracking treatment produces about 50% by weight of gas on the feed, it will be seen that a large part of the gas formed comprises very valuable products, i. e., olefins and diolefins, which may be recovered as such, or which, in the case of the olefins, may be used in the alkylation step. The diolefins form valuable products which are recovered as such. The cracking process therefore performs the function of taking the charge stock molecules apart into basic molecular groupings which may then be reassembled as desired by the subsequent processing to result in a desired product having unusual properties.

The analysis of one type of aviation gasoline blending stock which may be obtained with my process contains about (a) 40% by volume of branched chain $C_5$, $C_6$, $C_7$ and $C_8$ hydrocarbons with this fraction comprising mostly $C_7$ and $C_8$ hydrocarbons, (b) about 34% by volume of 2,3-dimethyl butane and (c) about 26% by volume of an aromatic fraction consisting essentially of benzene, toluene and xylenes with the benzene not over about 5% of the total blending stock. The percentages of fractions a, b, and c may be varied but according to my invention the presence of a relatively large amount of 2,3-dimethyl butane is preferred in the combination of fractions above set forth.

While I have set forth different forms of my process and have included specific details as to temperatures, pressures, feed compositions, etc., and one example of an aviation blending stock or fuel, it is to be understood that these are by way of illustration only and that changes and modifications may be made without departing from the spirit of my invention.

What I claim is:

1. In a process for producing aviation gasoline blending stock, the steps which comprise severely thermally cracking in a single stage at a temperature in the range of about 1200° F. to 1400° F. a heavy naphtha in the boiling range of about 200° F. to about 410° F. to convert substantially all of the paraffins and naphthenes into aromatic hydrocarbons including benzene, toluene and xylenes admixed with olefins containing a large amount of ethylene and some diolefins, separating from the cracked products an aromatic fraction consisting essentially of aromatic hydrocarbons in the aviation gasoline boiling range and ethylene, catalytically alkylating the separated ethylene with isobutane to form a branched chain hydrocarbon fraction containing an appreciable amount of 2,3 dimethyl butane and blending at least part of the separated aromatic fraction with the alkylated branched chain hydrocarbon fraction to form aviation gasoline blending stock.

2. A method according to claim 1 wherein isobutane is separated from the heavy naphtha before the severe thermal cracking step and the separated isobutane is used in the catalytic alkylation of ethylene.

3. A method according to claim 1 wherein the olefins in addition to ethylene contain $C_3$ and $C_4$ olefins, the $C_3$ and $C_4$ olefins are separated and catalytically alkylated with isobutane to form higher boiling branched chain hydrocarbons in the aviation gasoline boiling range and at least part of the last-mentioned hydrocarbons is blended with the mixture of branched chain hydrocarbon fraction and aromatic fraction.

4. In a process for producing aviation gasoline blending stock, the steps which comprise thermally cracking in a single stage a heavy virgin naphtha in the boiling range of about 200° F. to 410° F. at a temperature in the range of about 1200° F. to 1400° F. to convert paraffins and naphthenes into aromatic hydrocarbons boiling in the aviation gasoline boiling range, said aromatic hydrocarbons comprising a fraction consisting essentially of benzene, toluene and xylenes, ethylene, $C_3$ and $C_4$ olefins, segregating ethylene from $C_3$ and $C_4$ olefins, catalytically alkylating isobutane and the separated ethylene to form branched chain hydrocarbons in the aviation gasoline boiling range and including 2,3 dimethyl butane, separately catalytically alkylating isobutane with the separated $C_3$ and $C_4$ olefins to produce branched chain paraffins in the aviation gasoline boiling range and blending the aromatic hydrocarbons with at least part of said branched chain hydrocarbons and said branched chain paraffins.

5. A process of producing aviation gasoline blending material which comprises separating normal butane and isobutane from a heavy naphtha fraction, catalytically isomerizing the separated normal butane to form an additional amount of isobutane which is added to the separated isobutane, thermally cracking the remaining heavy naphtha fraction in the boiling range of about 200° F. to 410° F. at a temperature in the range of 1200° F. to 1400° F. to convert paraffins to aromatic hydrocarbons, ethylene, other olefins and diolefins, separating ethylene from the cracked products, catalytically alkylating said isobutane with the separated ethylene to form higher boiling branched chain hydrocarbons containing an appreciable amount of 2,3 dimethyl butane, treating the aromatic hydrocarbons to remove olefins and diolefins therefrom and recovering an aromatic fraction containing benzene, toluene and xylenes and mixing the higher boiling branched chain hydrocarbons with the aromatic fraction to produce an aviation gasoline blending material.

6. A process for producing blending material for aviation gasoline which comprises fractionating a hydrocarbon oil to separate isobutane, a $C_5$ fraction and a $C_6$ fraction from a heavy naphtha, thermally cracking the resulting heavy naphtha in the boiling range of about 200° F. to 410° F. at a temperature in the range of 1200° F. to 1400° F. to produce aromatic hydrocarbons in the aviation gasoline boiling range having admixed therewith olefins including ethylene and diolefins, separating ethylene and an aromatic fraction containing a major proportion of benzene and toluene from the cracked products, catalytically alkylating the separated ethylene and said isobutane to produce branched chain hydrocarbons including an appreciable amount of 2,3 dimethyl butane, catalytically isomerizing the separated $C_5$ and $C_6$ hydrocarbons to form iso hydrocarbons and mixing said last-mentioned iso hydrocarbons with said separated aromatic fraction and said branched chain hydrocarbons containing 2,3 dimethyl butane to form aviation gasoline blending material.

7. A process according to claim 6 wherein the thermally cracked products include isobutane, propylene and butylenes, the propylene and butylenes are separately catalytically alkylated with isobutane at least part of which is recovered from the thermally cracked products to form higher boiling branched chain hydrocarbons and fractionating the last-mentioned hydrocarbons to recover branched chain hydrocarbons in the aviation gasoline boiling range and which are mixed with said aviation gasoline blending material.

CLARKE T. HARDING.

REFERENCES CITED

The following references are of record in the file of this patent:

UNITED STATES PATENTS

| Number | Name | Date |
|---|---|---|
| 2,172,560 | Kemp et al. | Sept. 12, 1939 |
| 2,292,677 | Thomas | Aug. 11, 1942 |
| 2,204,215 | Greensfelder et al. | June 11, 1940 |
| 2,091,375 | Pyzel | Aug. 31, 1937 |
| 2,238,860 | Kemp | Apr. 15, 1941 |
| 2,342,166 | Plummer | Feb. 22, 1944 |
| 2,361,611 | D'Ouville | Oct. 31, 1944 |
| 2,311,498 | Voorhies | Feb. 16, 1943 |
| 2,361,054 | Pevere | Oct. 24, 1944 |
| 2,263,557 | Greenewalt | Nov. 25, 1941 |
| 2,339,560 | De Simo et al. | Jan. 18, 1944 |
| 2,240,134 | Egloff | Apr. 29, 1941 |
| 2,330,206 | Dryer et al. | Sept. 28, 1943 |
| 2,360,463 | Arveson | Oct. 17, 1944 |
| 2,370,533 | Gershinowitz | Feb. 27, 1945 |
| 2,340,600 | Lamb et al. | Feb. 1, 1944 |
| 2,366,736 | Linn et al. | Jan. 9, 1945 |
| 2,276,171 | Ewell | Mar. 10, 1942 |

OTHER REFERENCES

Pages 18 and 19 of "The Oil and Gas Journal," of March 19, 1942. (Copy in Division 31 at 196-49.)